United States Patent

Rosenthal

[15] 3,676,514

[45] July 11, 1972

[54] PROCESS FOR ADDING METHYL SUBSTITUENTS TO AROMATIC HYDROCARBONS

[72] Inventor: Robert W. Rosenthal, Pittsburgh, Pa.

[73] Assignee: Gulf Rsearch & Development Company, Pittsburgh, Pa.

[22] Filed: Sept. 5, 1959

[21] Appl. No.: 855,781

[52] U.S. Cl. .................. 260/668, 260/651 HA, 260/671 M
[51] Int. Cl. ............................................. C07c 15/02
[58] Field of Search ................. 260/671 M, 651 HA, 668 R

[56] References Cited

UNITED STATES PATENTS

| | | | |
|---|---|---|---|
| 1,727,682 | 9/1929 | Tschunkur et al. | 260/671 M |
| 2,486,542 | 11/1949 | Weisler et al. | 260/671 M |
| 2,951,100 | 8/1960 | Adams et al. | 260/651 HA |
| 3,069,480 | 12/1962 | Hirth et al. | 260/651 HA |
| 3,168,580 | 2/1965 | Adams | 260/651 HA |

*Primary Examiner*—Curtis R. Davis
*Attorney*—Meyer Neishloss, Deane E. Keith and Joseph J. Carducci

[57] ABSTRACT

A process for adding from one to two methyl substituents to an aromatic hydrocarbon which involves reacting the aromatic hydrocarbon with formaldehyde in an aqueous HCl medium in an atmosphere containing gaseous HCl at an elevated pressure to obtain a chloromethyl aromatic hydrocarbon, reacting the chloromethyl aromatic hydrocarbon with hydrogen in the presence of a hydrogenation catalyst and gaseous HCl at an elevated pressure to obtain the desired methyl aromatic hydrocarbon, hydrogen and gaseous HCl and recycling the latter hydrogen and gaseous HCl to the first stage of the process.

6 Claims, No Drawings

PROCESS FOR ADDING METHYL SUBSTITUENTS TO AROMATIC HYDROCARBONS

This invention relates to a process for adding from one to two methyl substituents to the nucleus of an aromatic hydrocarbon, particularly to a process for converting pseudocumene to durene.

The process requires two stages. In the first stage the reactants are an aromatic hydrocarbon, formaldehyde and HCl. The aromatic hydrocarbon can be any aromatic hydrocarbon having at least one or two available positions on the nucleus thereon for the addition thereto of one to two methyl substituents. Examples of aromatic hydrocarbons which can be employed are benzene, toluene, p-xylene, ethyl benzene, pseudocumene, durene, naphthalene, anthracene, etc. Of these pseudocumene is preferred. Formaldehyde can be used as the solid paraformaldehyde, its monomer or, as an aqueous solution thereof, for example, formalin. When an aqueous solution is used it can contain from about 30 to about 50 percent by weight of formaldehyde. As will be pointed out below HCl is employed as an aqueous solution, for example, a 35 to about 40 percent by weight aqueous solution, and in the gaseous form.

In carrying out the first stage of the process the aromatic hydrocarbon, formaldehyde and aqueous HCl solution are placed in a closed reactor and the contents thereof are then pressured with gaseous HCl. This pressuring is continued until the aqueous phase is saturated with HCl, if a substantially completely aqueous phase is not initially present, and then the desired reaction of HCl with the aromatic hydrocarbon to form the chloromethyl derivative thereof takes place.

The amounts of reactants required are those amounts that will result in the production in the first stage of the desired chloromethyl derivative of the reactant aromatic hydrocarbon. Thus, for each chloromethyl substituent added to the nucleus of the aromatic hydrocarbon 1 mol of formaldehyde and 1 mol of HCl are needed. The temperature of the reaction can be, for example, from about 50° to about 120° C., preferably from about 60° to about 80° C., and the pressure from about 10 to about 200 pounds per square inch gauge, preferably from about 45 to about 90 pounds per square inch gauge. The amount of time required for reaction of the aromatic hydrocarbon with the formaldehyde and HCl can be, for example, from about 2 to about 10 hours, preferably from about 4 to about 8 hours.

Although it is not necessary that the initial operation of the process described and claimed herein be carried out in the presence of hydrogen, subsequent operation of the process, which will be described hereinafter, will require that hydrogen be present. The amount of hydrogen present in the first stage, on a volume basis relative to the total gaseous HCl therein, will be, for example, from about 1:2 to about 10:1, preferably from about 1:1 to about 2:1.

At the end of the first stage, the reaction product resolves itself into an upper gaseous phase containing the unreacted gaseous HCl and whatever hydrogen was present in the first stage and helped to provide the desired pressure therein, an intermediate organic layer containing the desired chloromethyl aromatic hydrocarbon and unreacted aromatic hydrocarbon, if any, and a lower aqueous layer saturated with HCl. The lower aqueous layer is separated from the reaction product, for example, by draining, and in a preferred embodiment is recycled to the first stage of the process. This is desirable, since the aqueous layer is saturated with HCl and therefore no further saturation thereof in continued operation will be required.

The chloromethyl aromatic hydrocarbon obtained in the first stage is then subjected to hydrogenation in the second stage of the process in the presence of a suitable hydrogenation catalyst, such as palladium on carbon, for example, where the palladium can be from about 1 to about 10 percent, preferably from about 1 to about 5 percent, by weight of the total catalyst. The amount of palladium required relative to the chloromethyl aromatic hydrocarbon can be from about 0.1 to about 5 percent, preferably from about 0.3 to about 0.6 percent by weight. The hydrogenation is carried out with the chloromethyl aromatic hydrocarbon dissolved in a suitable polar solvent, for example, an alcohol, such as methanol, ethanol, propanol, etc.; an ester, such as ethyl acetate, propyl acetate, etc.; a ketone, such as acetone, methyl ethyl ketone, etc. The amount of solvent employed can vary over wide limits, for example, from about 100 to about 1,000 percent by weight, based upon the chloromethyl aromatic hydrocarbon being treated.

The reaction is simply effected. The slurry is stirred and maintained, for example, at a temperature of about 25° to about 80° C., preferably about 25° to about 30° C., and a pressure of about 10 to about 200, preferably about 45 to about 90, pounds per square inch gauge, for about one-half to about 6 hours, preferably for about 1 to about 2 hours. The pressure in the second stage is maintained by the unreacted gaseous HCl from the first stage and from the hydrogen which has been added to the system. If the hydrogen has not been added initially in the first stage of the process it is added to the second stage of the process. The amount needed, on a molar basis, is equivalent, to the mols of chloromethyl substituent on the chloromethyl aromatic hydrocarbon that is converted to the methyl derivative thereof. The amount present is more than the amount needed for hydrogenation. The excess hydrogen helps the HCl to maintain the desired pressure in each of the two stages. In the second stage the volume ratio of hydrogen to gaseous HCl can be from about 1:2 to about 10:1, preferably from about 1:1 to about 2:1. Desirably the pressure in each of the first and second stages are approximately the same for ease and facility of operation.

As a result of the conditions prevailing in the second stage the chloromethyl substituent is converted to the methyl derivative and the desired methyl aromatic hydrocarbon is obtained. No hydrogenation of the ring is noted. In so doing, 1 mol of hydrogen is consumed in converting the chloromethyl to the methyl substituent and converting the chlorine so replaced to HCl.

The desired alkyl aromatic hydrocarbon is recovered from the reaction product in any suitable manner. For example, the reaction product is bled and the gaseous mixture of hydrogen and HCl present are preferably recycled to the first stage of the process, after which the catalyst is removed from the remainder of the reaction product by filtration. Any hydrogen that must be added to the system can be added to the recycle to maintain the desired balance herein, or it may be added to the gaseous product from the second stage. The organic phase remaining contains the desired alkyl aromatic and recovery thereof can be effected in any convenient manner. For example, fractional distillation is effective in removing, successively, the solvent and desired alkyl aromatic compound from the organic phase. In some cases, for example, in the preparation of durene from pseudocumene, cooling the product to a temperature of about 0° to 10° C. will result in the crystallization of durene, which can then be recovered by filtration.

The process can further be illustrated by the following.

EXAMPLE I

Into a glass pressure vessel were placed pseudocumene (120 grams, 1 mol), paraformaldehyde (91 percent, 16.5 grams, 0.5 mol) and 37 percent aqueous hydrochloric acid (1,500 milliliters). The system was pressured to 20 pounds per square inch gauge with gaseous HCl until no more adsorption occurred. The reaction mixture was then heated to 60° to 63° C. with vigorous stirring for 3 hours. The mixture was cooled, the gaseous phase bled off and stored, the aqueous layer separated for recycle, and the organic layer distilled until the unreacted pseudocumene (55.5 grams, 0.46 mol) was recovered at 80° to 90° C. at 30 millimeters of mercury pressure.

The residue was dissolved in twice its volume of ethanol and was hydrogenated for 1 hour at room temperature under 40 pounds per square inch gauge of hydrogen over 5 percent palladium on charcoal. The gaseous phase was bled off and chilling of the solution yielded 35.3 grams (0.27 mol) of durene, melting point 78° to 80° C. The mother liquor upon distillation yielded a mixture of 0.07 mol durene and 0.08 mol of isomeric pseudodurene and a residue of 0.02 mol of pentamethylbenzene.

EXAMPLE II

Into a glass pressure vessel were placed pseudocumene (24 grams, 0.2 mol), paraformaldehyde (91 percent, 6.6 grams, 0.2 mol), and 37 percent aqueous hydrochloric acid (100 milliliters). The mixture was pressured to 40 pounds per square inch gauge with a 1:1 $H_2$:HCl gaseous mixture until no further adsorption occurred. The mixture was heated to 62° C. with vigorous stirring for 5.5 hours. The mixture was cooled, the gases bled off, the aqueous layer separated, and the organic layer analyzed by hydrogenation followed by gas liquid chromatography for conversion of pseudocumene and efficiency to durene, pseudodurene, and pentamethylbenzene. In a similar run carried out for 2.5 hours with HCl gas alone the pseudocumene conversion was 82 percent with efficiencies of 66 percent to durene, 16 percent to pseudodurene, and 5 percent to pentamethylbenzene. In this case the pseudocumene conversion was 87 percent with efficiencies of 63 percent to durene, 14 percent to pseudodurene, and 5 percent to pentamethylbenzene.

This experiment demonstrates that the presence of a large amount of hydrogen in the hydrogen chloride in the first stage does not alter the desired chloromethylation reaction. The reaction was slowed down somewhat but the efficiencies achieved at the same pseudocumene conversion levels were the same.

EXAMPLE III

Pseudocumene (24 grams, 0.2 mol) was chloromethylated in a manner similar to the procedure of EXAMPLE I above. A 1-gram sample of the chloromethylated product was hydrogenated over 0.1 gram of 5 percent palladium on carbon in 6 milliliters of ethyl acetate at room temperature and 45 pounds per square inch gauge of $H_2$ for 1 hour. The sample was found to be 61.5 percent durene and 14.2 percent pseudodurene. Another 1-gram sample was similarly hydrogenated except that 45 pounds per square inch gauge of 1:1 $H_2$:HCl gas was used. It was found to be 62.8 percent durene and 14.6 percent pseudodurene.

This experiment shows that the presence of major amounts of HCl in the hydrogen used to reduce the chloromethyl derivatives to methyl derivatives does not alter the efficiencies of products formed. This run and EXAMPLE II shows that both steps can be carried out with a 1:1 $H_2$:HCl gas mixture and that the off-gas from the second stage of the process can be recycled to the first stage of the process, thus avoiding hydrogen purification and hydrogen chloride consumption.

Obviously, many modifications and variations of the invention, as hereinabove set forth, can be made without departing from the spirit and scope thereof, and therefore only such limitations should be imposed as are indicated in the appended claims.

I claim:

1. A process for adding from one to two methyl substituents to an aromatic hydrocarbon which comprises placing said aromatic compound, formaldehyde and aqueous HCl in a closed reactor, pressuring the contents thereof with gaseous HCl to a pressure of about 10 to about 200 pounds per square inch gauge until the aqueous phase is saturated with HCl, heating said contents at a temperature of about 50° to about 120° C. to obtain a first product containing the chloromethyl group, separating an aqueous phase from said first product, reacting said chloromethyl derivative with hydrogen and gaseous HCl in a polar solvent in the presence of a hydrogenation catalyst at an elevated pressure substantially equal to that in the first stage to obtain a second product containing the corresponding methyl derivative of said chloromethyl aromatic hydrocarbon, and a mixture of hydrogen and gaseous HCl, recycling said removed aqueous phase and said latter mixture to the first stage of the process and continuing the operation as hereinabove defined.

2. The process of claim 1 wherein the reactant aromatic is pseudocumene.

3. The process of claim 1 wherein the reactant aromatic is pseudocumene and the hydrogenation catalyst is palladium on carbon.

4. The process of claim 1 wherein the reactant aromatic is pseudocumene and the operation consumes substantially solely aromatic hydrocarbon, formaldehyde and hydrogen.

5. The process of claim 1 wherein the polar solvent is ethanol.

6. The process of claim 1 wherein the reactant aromatic is pseudocumene and the temperature in the second stage is about 25° to about 80° C.

* * * * *